United States Patent
Oh

(10) Patent No.: US 12,059,960 B2
(45) Date of Patent: Aug. 13, 2024

(54) PARKING BRAKE FAIL SAFETY CONTROL SYSTEM FOR VEHICLE HAVING ELECTRIC-AXLE AND METHOD THEREOF

(71) Applicants: Hyundai Motor Company, Seoul (KR); Kia Corporation, Seoul (KR)

(72) Inventor: June Oh, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 375 days.

(21) Appl. No.: 17/402,912

(22) Filed: Aug. 16, 2021

(65) Prior Publication Data

US 2022/0297548 A1 Sep. 22, 2022

(30) Foreign Application Priority Data

Mar. 16, 2021 (KR) .................. 10-2021-0033740

(51) Int. Cl.
*B60L 15/20* (2006.01)
*B60K 1/02* (2006.01)
*B60T 1/12* (2006.01)
*B60T 7/02* (2006.01)

(52) U.S. Cl.
CPC .......... *B60L 15/2018* (2013.01); *B60K 1/02* (2013.01); *B60T 1/12* (2013.01); *B60T 7/02* (2013.01); *B60T 2210/20* (2013.01); *B60T 2220/00* (2013.01); *B60T 2240/00* (2013.01); *B60T 2250/00* (2013.01); *B60T 2260/09* (2013.01); *B60T 2270/402* (2013.01)

(58) Field of Classification Search
CPC .......... B60L 15/2018; B60L 2220/42; B60L 2240/30; B60L 2260/22; B60L 15/2009; B60L 2200/36; B60K 1/02; B60T 1/12; B60T 7/02; B60T 2210/20; B60T 2220/00; B60T 2240/00; B60T 2250/00; B60T 2260/09; B60T 2270/402; B60T 7/122; B60Y 2200/14

See application file for complete search history.

(56) References Cited

U.S. PATENT DOCUMENTS

| | | | |
|---|---|---|---|
| 2013/0184906 A1* | 7/2013 | Harper | B60L 15/2009 701/22 |
| 2018/0065629 A1* | 3/2018 | Wolff | E02F 9/2095 |
| 2018/0118228 A1* | 5/2018 | Worden | B60T 17/228 |
| 2021/0197820 A1* | 7/2021 | Keller | B60K 1/02 |

FOREIGN PATENT DOCUMENTS

JP H02179575 A * 7/1997 ............. B60T 17/22

OTHER PUBLICATIONS

English translation of Saito (JP-H02179575) (Year: 1997).*

* cited by examiner

*Primary Examiner* — James M McPherson
*Assistant Examiner* — Kyle J Kingsland
(74) *Attorney, Agent, or Firm* — MORGAN, LEWIS & BOCKIUS LLP

(57) ABSTRACT

A parking brake fail safety control system and method for a vehicle having an electric-axle, may enable safe parking braking on a level ground, a slope, etc. By controlling the torque from a first motor configured for a rear wheel-first electric-axle and the torque from a second motor configured for a rear wheel-second electric-axle to have the same magnitude in opposite directions and by increasing/decreasing the torque from the first motor and the torque from the second motor, depending on a change of wheel speed when a parking brake fails.

17 Claims, 4 Drawing Sheets

PARKING BRAKE FAIL SAFETY CONTROL SYSTEM FOR VEHICLE HAVING ELECTRIC-AXLE AND METHOD THEREOF

CROSS REFERENCE TO RELATED APPLICATION

The present application claims priority to Korean Patent Application No. 10-2021-0033740, filed on Mar. 16, 2021, the entire contents of which is incorporated herein for all purposes by this reference.

BACKGROUND OF THE INVENTION

Field of the Invention

The present invention relates to a parking brake fail safety control system for vehicle having an electric-axle and a method thereof. More particularly, the present invention relates to a parking brake fail safety control system and method for vehicle having an electric-axle, the system and method facilitating safety parking braking by controlling motor torque of an electric-axle when parking braking fails.

Description of Related Art

As eco-friendly vehicles such as an electric vehicle and fuel cell electric vehicle come into the market, a battery electric truck or a fuel cell electric vehicle provided with electric-axle assembly are being developed as a kind of eco-friendly commercial vehicles.

Common vehicles having the electric-axle may be developed to a level satisfying both of the driving and braking performance of vehicles provided with a diesel engine.

For example, one of the peculiar functions of diesel trucks of the related art is a parking brake fail safety function that can restrict movement of a vehicle as if a parking brake is operated when the parking brake fails, and such a parking brake fail safety function may also be applied to common vehicles having an electric-axle.

The parking brake fail safety function of diesel engine trucks, which is one of the functions of an automatic transmission, is a function that makes the speed of the output shaft of an automatic transmission into zero (0) such that a vehicle cannot be moved by restricting predetermined components of a plurality of planetary gear sets of the automatic transmission through clutch and brake elements when the parking brake of the diesel engine trucks breaks down or when unintended pushing of a vehicle is detected with the N-gear engaged.

The parking brake fail safety function of diesel engine trucks may be achieved by an automatic transmission mounted on the output shaft of an engine. However, since common vehicles having an electric-axle use power from a motor and a reducer, a parking brake fail safety function which may be achieved in another way is required.

In other words, considering that common vehicles having an electric-axle may be developed to a level satisfying both of the driving and braking performance of vehicles provided with a diesel engine, the parking brake fail safety function may also be applied to the common vehicles.

The information included in this Background of the present invention section is only for enhancement of understanding of the general background of the present invention and may not be taken as an acknowledgment or any form of suggestion that this information forms the prior art already known to a person skilled in the art.

BRIEF SUMMARY

Various aspects of the present invention are directed to providing a parking brake fail safety control system and method for a vehicle having an electric-axle, the system and method facilitating safe parking braking on a level ground, a slope, etc. by controlling the torque from a first motor of a rear wheel-first electric-axle and the torque from a second motor of a rear wheel-second electric-axle to have the same magnitude in opposite directions and by increasing/decreasing the torque from the first motor and the torque from the second motor, depending on a change of wheel speed when a parking brake fails.

To achieve the objectives, a parking brake fail safety control system for a vehicle having an electric-axle according to various exemplary embodiments of the present invention includes: a parking brake switch configured to be turned on in response to a driver's operation a wheel speed sensor configured for detecting a change in wheel speed of the vehicle; a first motor included in a rear wheel-first electric-axle of the vehicle; a second motor included in a rear wheel-second electric-axle of the vehicle; and a controller determining that a parking brake fails and controlling torque of the first motor and torque of the second motor to have a same magnitude in opposite directions upon determining that there is a change in the wheel speed according to a signal received from the wheel speed sensor after receiving a turning-on signal of the parking brake switch.

The system may further include a door-opening sensor electrically connected to the controller and configured for outputting an opening signal when a door of the vehicle is open, to facilitate the controller to determine whether the parking brake fails.

The controller may be configured to determine that the parking brake fails, and control the torque of the first motor and the torque of the second motor to have a same magnitude in opposite directions upon determining that there is a change in the wheel speed according to the signal received from the wheel speed sensor after receiving the opening signal from the door-opening sensor.

The system may further include a longitudinal acceleration sensor electrically connected to the controller and configured for facilitating the controller to determine whether the vehicle is on an uphill slope with a positive slope or a downhill slope with a negative slope when there is still a change in wheel speed after the torque of the first motor and the torque of the second motor are controlled to have the same magnitude in opposite directions.

The controller may decrease the torque of the first motor until the wheel speed becomes zero if the wheel speed is greater than 0 and may increase the torque of the first motor until the wheel speed becomes zero if the wheel speed is smaller than 0, when the controller is configured to determine that it is an uphill slope on the basis of a signal from the longitudinal acceleration sensor.

The controller may increase the torque of the second motor until the wheel speed becomes zero if the wheel speed is greater than 0 and may decrease the torque of the second motor until the wheel speed becomes zero if the wheel speed is smaller than 0, when the controller is configured to determine that it is a downhill slope according to a signal received from the longitudinal acceleration sensor.

The controller may decrease the torque of the first motor until the wheel speed becomes zero if the wheel speed is greater than 0 and may decrease the torque of the second motor until the wheel speed becomes zero if the wheel speed is smaller than 0, even though the controller determines that the vehicle is not on the uphill slope or the downhill slope according to a signal received from the longitudinal acceleration sensor.

To achieve the objectives of the present invention, a parking brake fail safety control method for a vehicle having an electric-axle according to various exemplary embodiments of the present invention includes: determining whether a parking brake switch electrically connected to the controller is turned on; determining whether a parking brake of the vehicle fails; and controlling torque of a first motor included in a rear wheel-first electric-axle of the vehicle and torque of a second motor included in a rear wheel-second electric-axle of the vehicle to have the same magnitude in opposite directions by a controller, when it is determined that the parking brake fails.

The determining of whether a parking brake fails may include: detecting a wheel speed of the vehicle by a wheel speed sensor electrically connected to the controller; checking whether there is a change in wheel speed according to a detection signal received from the wheel speed sensor after receiving a turning-on signal from the parking brake switch; and determining that the parking brake fails when there is the change in the wheel speed.

The determining of whether a parking brake fails may include: detecting whether a door is opened by a door-opening sensor; detecting a wheel speed of the vehicle by a wheel speed sensor electrically connected to the controller; checking whether there is a change in wheel speed according to a detection signal received from the wheel speed sensor after a door-opening signal is received from the door-opening sensor by the controller; and determining that the parking brake fails when there is the change in the wheel speed.

The method may further include determining whether the vehicle is on an uphill slope with a positive slope or a downhill slope with a negative slope when there is still a change in wheel speed after the torque of the first motor and the torque of the second motor are controlled to have the same magnitude in opposite directions by the controller.

When it is determined that the vehicle is on an uphill slope, the torque of the first motor may be decreased until the wheel speed becomes zero if the wheel speed is greater than 0 and the torque of the first motor may be increased until the wheel speed becomes zero if the wheel speed is smaller than 0.

When it is determined that the vehicle is on a downhill slope, the torque of the second motor may be increased until the wheel speed becomes zero if the wheel speed is greater than 0 and the torque of the second motor may be decreased until the wheel speed becomes zero if the wheel speed is smaller than 0.

Even though it is determined that it is not an uphill slope or a downhill slope, the torque of the first motor may be decreased until the wheel speed becomes zero if the wheel speed is greater than 0 and the torque of the second motor may be decreased until the wheel speed becomes zero if the wheel speed is smaller than 0.

Various aspects of the present invention provide the following effects through the objectives described above.

First, when the parking brake of a vehicle having an electric-axle fails, the torque ((+) torque which is forward torque) of the first motor of the rear wheel-first electric-axle and the torque ((−) torque which is backward torque) of the second motor of the rear wheel-second electric-axle are controlled to have the same magnitude in opposite directions, whereby parking braking that restricts movement of the vehicle may be achieved.

Second, on an uphill slope with a (+) slope, the torque ((+) torque which is forward torque) of the first motor of the rear wheel-first electric-axle and the torque ((−) torque which is backward torque) of the second motor of the rear wheel-second electric-axle are controlled to have the same magnitude in opposite directions and then the torque of the first motor is decreased or increased, whereby it is possible to achieve parking braking that prevents the vehicle from being pushed while restricting movement of the vehicle.

Third, on an downhill slope with a (−) slope, the torque ((+) torque which is forward torque) of the first motor of the rear wheel-first electric-axle and the torque ((−) torque which is backward torque) of the second motor of the rear wheel-second electric-axle are controlled to have the same magnitude in opposite directions and then the torque of the second motor is decreased or increased, whereby it is possible to achieve parking braking that prevents the vehicle from being pushed while restricting movement of the vehicle.

Fourth, since it is possible to achieve the parking brake fail safety function of the existing diesel engine trucks even in vehicles such as an electric truck or a fuel cell electric vehicle provided with an electric-axle assembly, it is possible to improve the braking performance of vehicles having an electric-axle over the braking performance of the existing vehicles provided with a diesel engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
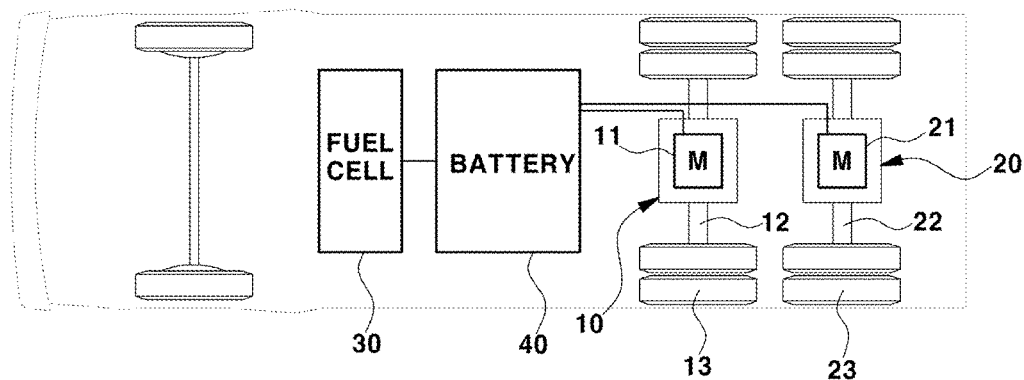
FIG. 1 is a schematic diagram showing a power train of a fuel cell electric truck of vehicles having an electric-axle.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

FIG. 1 is a schematic diagram showing a power train of a fuel cell electric truck of vehicles having an electric-axle.

As shown in FIG. 1, a fuel cell electric truck of vehicles having an electric-axle includes a fuel cell 30 generating electrical energy and a battery 40 being charged with the electrical energy generated by the fuel cell 30.

The fuel cell electric truck has a pair of rear wheels that are driving wheels at the rear in addition to front wheels at the front, in which a first electric-axle 10 is mounted at the front rear wheels of the pair of rear wheels and a second electric-axle 20 is mounted at the rear rear wheels.

The rear wheel-first electric axle 10 may include an axle housing, a first motor 11 mounted in the axle housing and being driven by the electrical energy of the fuel cell 30 or the battery 40, a first axle shaft 12 connected to an output shaft of the first motor 11, and first wheels 13 mounted at both end portions of the first axle shaft 12.

The rear wheel-second electric axle 20 may also include an axle housing, a second motor 21 mounted in the axle housing and being driven by the electrical energy of the fuel cell 30 or the battery 40, a second axle shaft 22 connected to an output shaft of the second motor 21, and second wheels 23 mounted at both end portions of the second axle shaft 22.

A reducer may be connected to the output shafts of the first motor 11 and the second motor 21.

The present invention was designed to enable a parking brake fail safety function of the peculiar functions of existing diesel engine trucks even in vehicles such as a fuel cell electric truck having an electric-axle.

Figure 2:
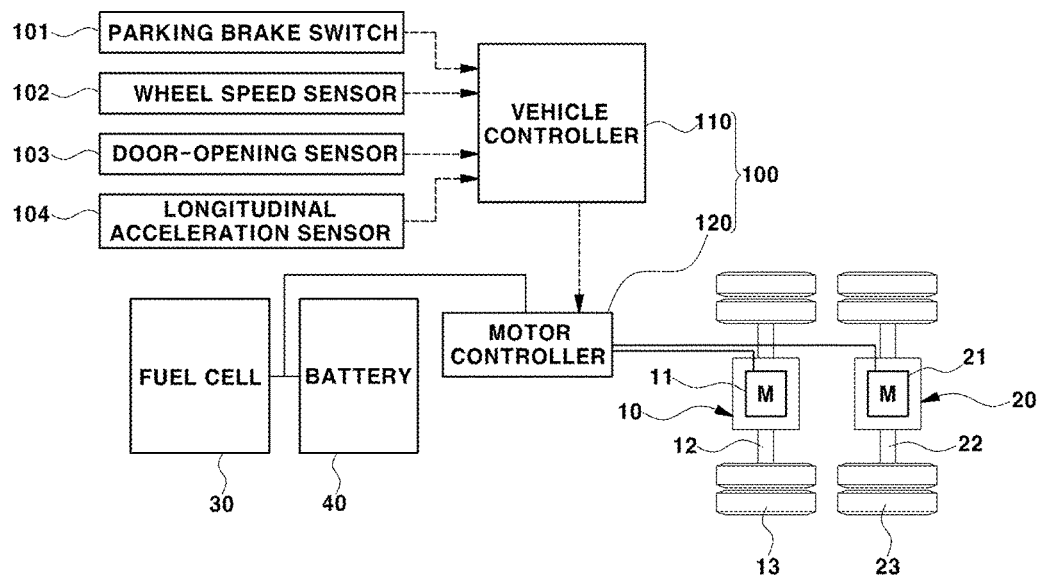
FIG. 2 is a diagram showing the configuration of a parking brake fail safety control system for a vehicle having an electric-axle according to various exemplary embodiments of the present invention.

FIG. 2 is a diagram showing the configuration of a parking brake fail safety control system for a vehicle having an electric-axle according to various exemplary embodiments of the present invention.

As shown in FIG. 2, a parking brake fail safety control system of the present invention includes: a parking brake switch 101; a wheel speed sensor 102; a door-opening sensor 103; a longitudinal acceleration sensor 104; and a controller 100 controlling torque of a first motor 11 of the rear wheel-first electric-axle 10 and torque of a second motor 21 of the rear wheel-second electric-axle 20 to have the same magnitude in opposite directions and by increasing/decreasing the torque from the first motor and the torque from the second motor on the basis of signals from the parking brake switch 101 and the wheel speed sensor 102 or signals from the parking brake switch 101 and the door-opening sensor 103, and increasing or decreasing the torque of the first motor 11 or the torque of the second motor 21 in a response to signals from the longitudinal acceleration sensor 104 and the wheel speed sensor 102.

The parking brake switch 101 is a switch which is operated by a driver to restrict movement of a vehicle that has been stopped, and when the parking brake switch is turned on, an Electric Parking Brake (EPD) system is operated and a vehicle is prevented from moving.

The wheel speed sensor 102, which detects wheel speed change, is provided to determine whether a parking brake fails.

The door-opening sensor 103, which outputs an opening signal when a door is opened, is provided to determine whether a parking brake fails.

The longitudinal acceleration sensor 104 is provided to determine whether a vehicle is stopped on an uphill slope or a downhill slope, and for example, may estimate an uphill slope having a (+) slope when the output value thereof is a (+) value, and may estimate a downhill slope having a (−) slope when the output value is a (−) value.

The controller 100 is configured to determine that the parking brake is not normally operated, that is, the parking brake fails (due to a short of a signal line of the EPB system, etc.) and to control the torque of the first motor 11 and the torque of the second motor 21 to have the same magnitude in opposite directions as parking brake fail safety control, when determining that there is a change in wheel speed on the basis of a signal from the wheel speed sensor 102 after receiving a turning-on signal of the parking brake switch 101.

In other words, when the parking brake switch 101 is turned on, the parking brake system (e.g., the EPB system) may operate normally and restrict movement of the vehicle, but when there is a change in wheel speed, it means that the vehicle is moving. Accordingly, the controller 100 determines that the parking brake fails, that is, the parking brake is not normally operated, and performs parking brake fail safety control when determining that there is a change in wheel speed after receiving the turning-on signal of the parking brake switch 101.

Accordingly, the controller 100, as parking brake fail safety control, controls the torque ((+) torque which is forward torque) of the first motor 11 of the rear wheel-first electric-axle 10 and the torque ((−) torque which is backward torque) of the second motor 21 of the rear wheel-second electric-axle 20 to have the same magnitude in opposite directions for a predetermined time period until the wheel speed becomes zero, whereby parking braking that restricts movement of the vehicle may be achieved.

The controller 100 may include: a vehicle controller 110 that receives the turning-on signal of the parking brake switch 101 and then receives a signal from the wheel speed sensor 102, and applies a motor torque instruction for parking brake fail safety control to a motor controller 120 when determining that there is a change in wheel speed; and the motor controller 120 that controls the torque of the first motor 11 of the rear wheel-first electric-axle 10 to be (+) torque which is forward torque and controls the torque of the second motor 21 of the rear wheel-second electric-axle 20 to be (−) torque which is backward torque on the basis of the motor torque instruction. The controllers are, in combination, referred to as a controller to help understand the present invention.

The controller 100 is configured to determine that the parking brake is not normally operated, that is, the parking brake fails (due to a short of a signal line of the EPB system, etc.) and to control the torque of the first motor 11 and the torque of the second motor 21 to have the same magnitude in opposite directions as parking brake fail safety control, when determining that there is a change in wheel speed on the basis of a signal from the wheel speed sensor 102 after receiving an opening signal of the door-opening sensor 103.

In other words, when a door is opened, the EPB system is automatically operated and restricts movement of the vehicle for safety. When a wheel speed changes with a door open, it means that the vehicle is moving, so when the controller 100 determines that there is a change in wheel speed after receiving the turning-on signal of the parking brake switch 101, the controller 100 determines that the parking brake fails, that is, the parking brake is not normally operated, and performs parking brake fail safety control.

Accordingly, the controller 100, as parking brake fail safety control, controls the torque ((+) torque which is forward torque) of the first motor 11 of the rear wheel-first electric-axle 10 and the torque ((−) torque which is backward torque) of the second motor 21 of the rear wheel-second electric-axle 20 to have the same magnitude in opposite directions for a predetermined time period until the wheel speed becomes zero, whereby parking braking that restricts movement of the vehicle even with a door open may be achieved.

If the wheel speed still changes without becoming zero even after the controller 100 controls the torque of the first motor 11 and the torque of the second motor 21 to have the same magnitude in opposite directions, the reason is because the vehicle may be pushed on an uphill slope with a (+) slope or a downhill slope with a (−) slope due to the load thereon.

Accordingly, it may be possible to determine whether a vehicle is parked on an uphill slope or a downhill slope and then perform parking braking that restricts movement of the vehicle and prevents the vehicle from pushing.

To the present end, the controller 100 may be configured to maintain the magnitude of the (−) torque of the second motor 21 and decrease the (+) torque of the first motor 11 until the wheel speed becomes zero (0) if the wheel speed is greater than 0 (the vehicle is moving forward), and to maintain the (−) torque of the second motor 21 and increase the (+) torque of the first motor 11 until the wheel speed becomes zero (0) if the wheel speed is smaller than 0 (the vehicle is being pushed rearward), when the controller 100 determines that it is an uphill slope with a (+) slope on the basis of a signal (e.g., (+) output value) from the longitudinal acceleration sensor 104.

Furthermore, the controller 100 may be configured to maintain the (+) torque of the first motor 11 and increase the (−) torque of the second motor 21 until the wheel speed becomes zero (0) if the wheel speed is greater than 0 (the vehicle is being pushed forward), and to maintain the (+) torque of the first motor 11 and decrease the (−) torque of the second motor 21 until the wheel speed becomes zero 0 if the wheel speed is smaller than 0 (the vehicle is moving rearward), when the controller 100 determines that it is a downhill slope with a (−) slope on the basis of a signal (e.g., (−) output value) from the longitudinal acceleration sensor 104.

Furthermore, the controller 100 may be configured to maintain the (−) torque of the second motor 21 and decrease the (+) torque of the first motor 11 until the wheel speed becomes zero if the wheel speed is greater than 0 (the vehicle is moving forward), and to maintain the (+) torque of the first motor 11 and decrease the (−) torque of the second motor 21 until the wheel speed becomes zero if the wheel speed is smaller than 0 (the vehicle is moving rearward thereof, even though the controller 100 determines that it is not an uphill slope or a downhill slope on the basis of a signal from the longitudinal acceleration sensor 104.

A parking brake fail safety control method for a vehicle having an electric-axle of the present invention is described in detail hereafter on the basis of the configuration of the system described above.

Figure 3:
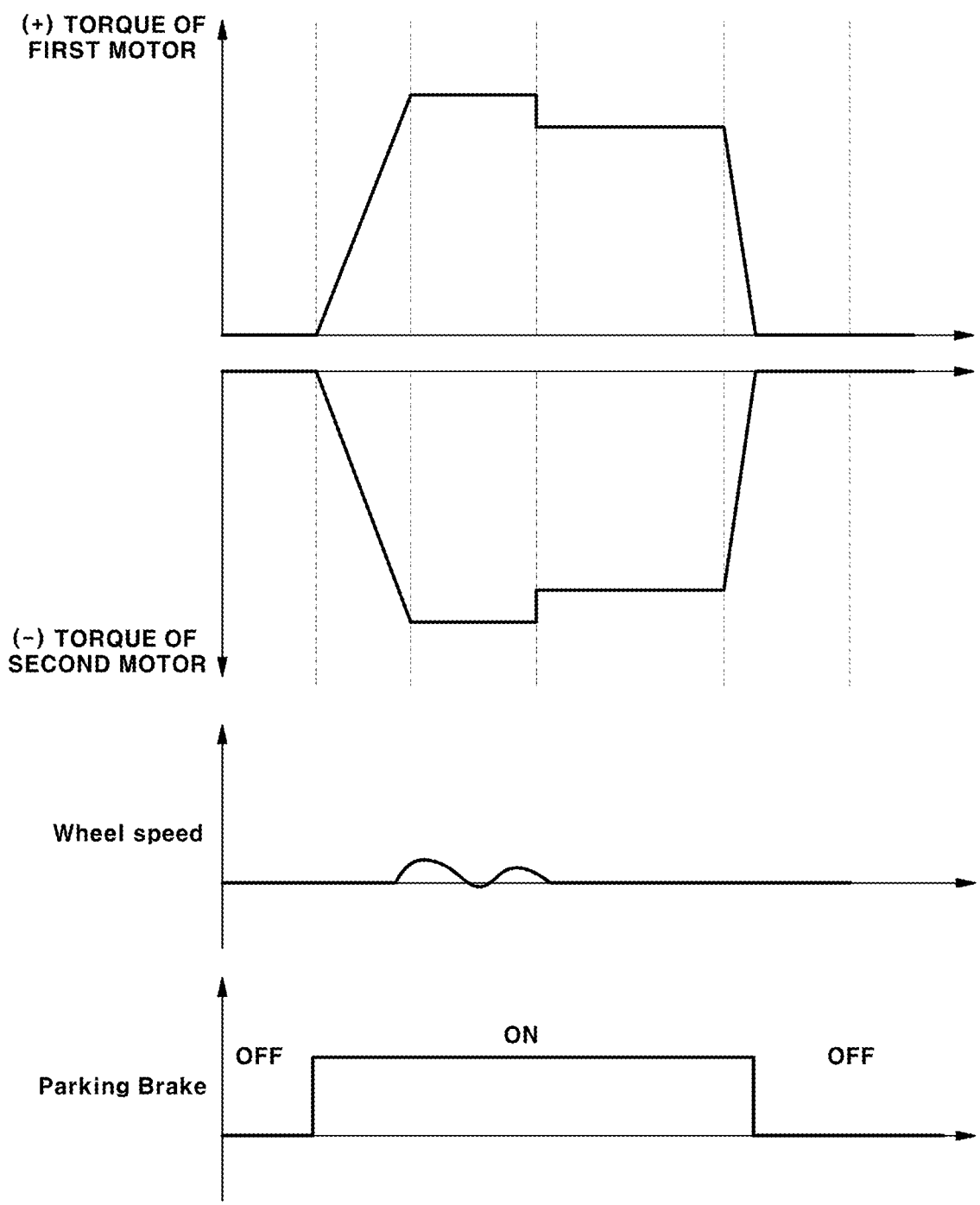
FIG. 3 is a graph showing an example of motor torque control for parking brake fail safety of a vehicle having an electric-axle according to various exemplary embodiments of the present invention.
Figure 4:
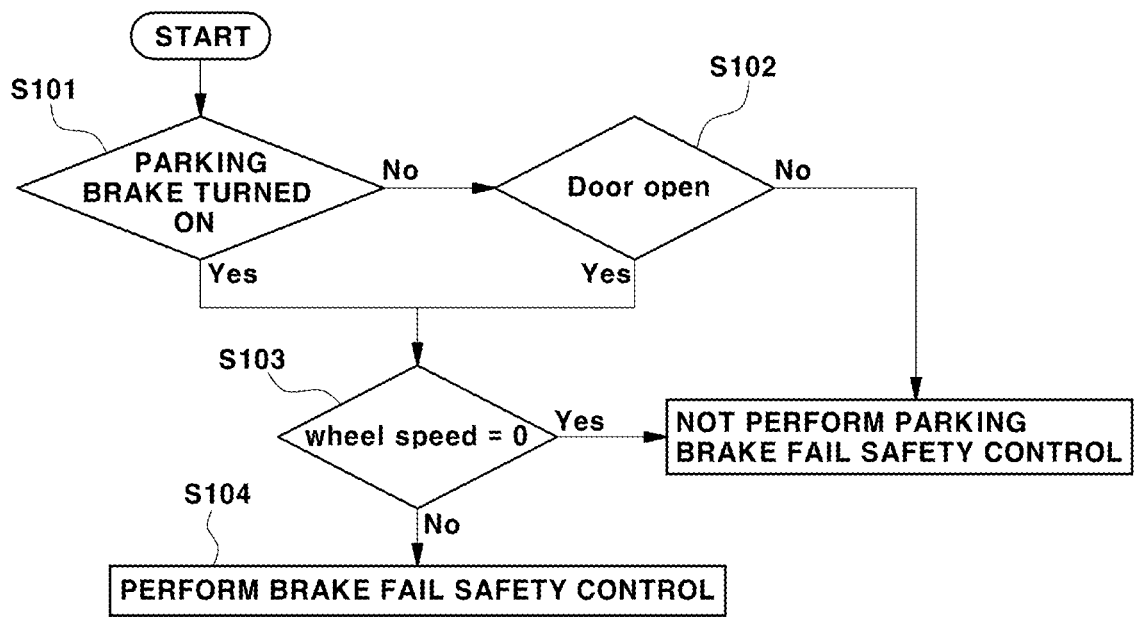
FIG. 4 and FIG. 5 are flowcharts showing the configuration of a parking brake fail safety control method for a vehicle having an electric-axle according to various exemplary embodiments of the present invention.
Figure 5:
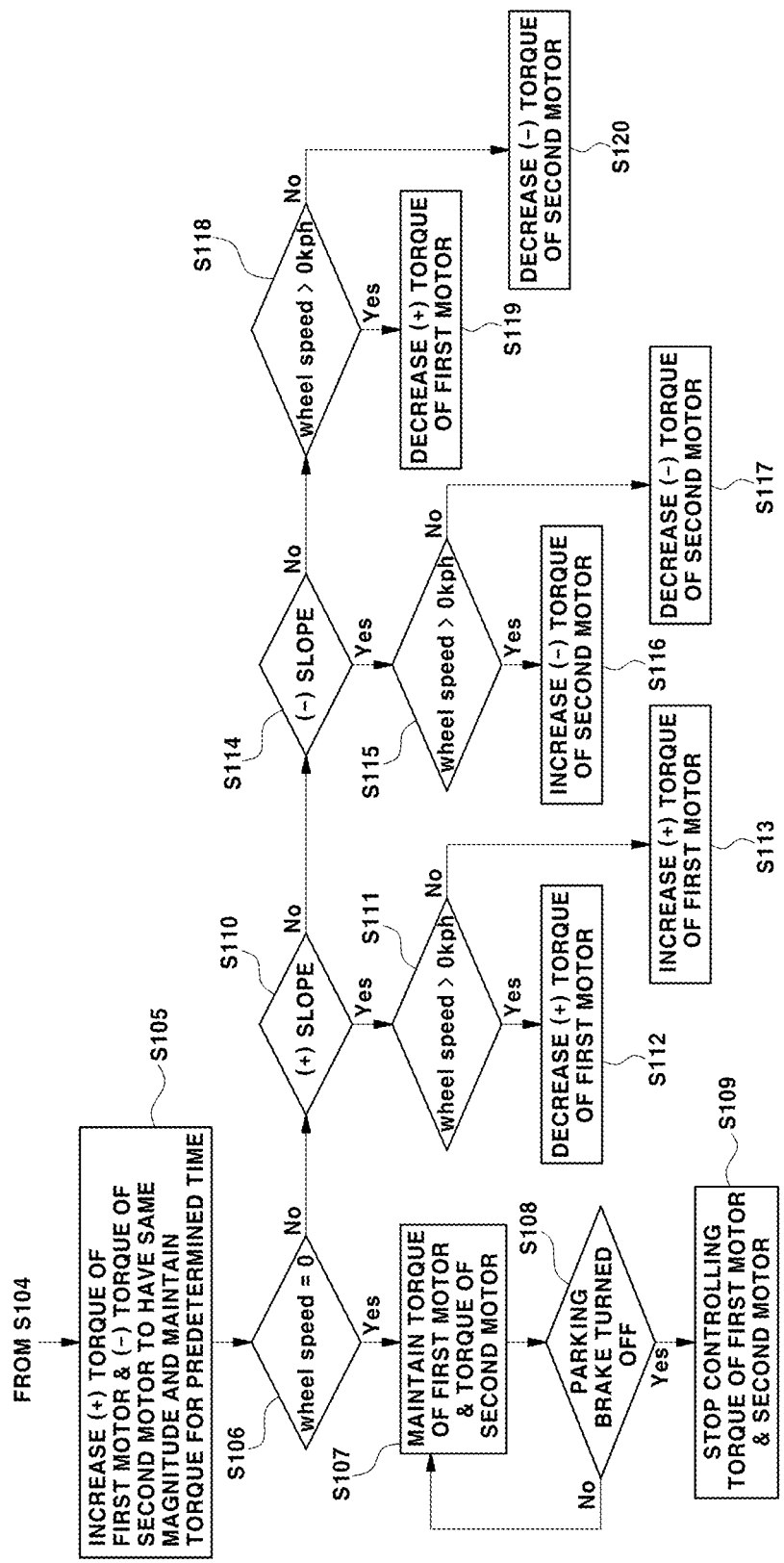

FIG. 3 is a graph showing an example of motor torque control for parking brake fail safety of a vehicle having an electric-axle according to various exemplary embodiments of the present invention, and FIG. 4 and FIG. 5 are flowcharts showing the configuration of a parking brake fail safety control method for a vehicle having an electric-axle according to various exemplary embodiments of the present invention.

First, when a vehicle having an electric-axle is parked, whether the parking brake is turned on by a driver is determined (S101).

That is, the controller 100 determines whether a tuning-on signal is output from the parking brake switch 101.

Next, the controller 100 determines whether the parking brake fails after receiving the turning-on signal from the parking brake switch 101.

Whether there is a change in wheel speed is checked to determine whether the parking brake fails (S103).

In detail, the determining of whether the parking brake fails may include detecting a wheel speed by the wheel speed sensor 102, checking whether there is a change in wheel speed on the basis of a detection signal from the wheel speed sensor 102 after the turning-on signal of the parking brake switch 101 is received (S103), and determining that the parking brake fails when there is the change in the wheel speed.

In other words, when the parking brake switch 101 is turned on, the parking brake system (e.g., the EPB system) may normally operate, the wheel speed becomes zero, and the vehicle is prevented from moving, but when there is a change in wheel speed, it means that the vehicle is moving. Accordingly, the controller 100 determines that the parking brake fails, that is, the parking brake is not operated normally when determining that the wheel speed changes without becoming zero after receiving the turning-on signal of the parking brake switch 101.

Next, when determining that the parking brake fails, that is, the parking brake is not normally operated, the controller performs parking brake fail safety control (S104).

Meanwhile, the parking brake system (e.g., EPB system) has a logic that automatically operates the parking brake to keep the vehicle stopped for safety when a door is open for getting on/off the vehicle with the vehicle stopped.

Accordingly, it is possible to check whether a door is opened (S102) and to determine whether the parking brake fails on the basis of a change of the wheel speed with a door open.

In detail, the determining of whether the parking brake fails may include: detecting whether a door is opened by the door-opening sensor 103; detecting a wheel speed by the wheel speed sensor 102; checking whether there is a change in wheel speed on the basis of a detection signal from the wheel speed sensor 102 after receiving a door-opening signal from the door-opening sensor 103 (S103); and determining that the parking brake fails when there is the change in the wheel speed.

In other words, when a door is opened, the parking brake system (e.g., the EPB system) may automatically operate, the wheel speed becomes zero, and the vehicle is prevented from moving, but when there is a change in wheel speed, it means that the vehicle is moving. Accordingly, the controller 103 determines that the parking brake fails, that is, the parking brake is not normally operated, and performs parking brake fail safety control (S104) when determining that the wheel speed changes without becoming zero after receiving a door-opening signal of the door-opening sensor 103.

Next, the controller 100, as parking brake fail safety control, increases the torque of the first motor 11 of the rear wheel-first electric-axle 10 and the torque of the second motor 21 of the rear wheel-second electric axle 20 to have the same magnitude in opposite direction and maintains the torque for a predetermined time period (S105) in FIG. 5.

In detail, the controller 100, as motor torque control for parking brake fail safety, increases the torque ((+) torque which is forward torque) of the first motor 11 of the rear wheel-first electric-axle 10 and the torque ((−) torque which is backward torque) of the second motor 21 of the rear wheel-second electric-axle 20 to have the same magnitude in opposite directions and maintains the torque for a predetermined time period until the wheel speed becomes zero.

Next, the controller 100 checks whether there is a change in wheel speed on the basis of the detection signal from the wheel speed sensor 102 (S106), and maintains the torque ((+) torque which is forward torque) of the first motor 11 and the torque ((−) torque which is backward torque) of the second motor 21 when the wheel speed is zero as the result of checking (S107), whereby parking braking that keeps the vehicle stopped may be achieved.

Furthermore, the controller 100 checks whether the parking brake switch 101 is turned off (S108), and stops controlling the torque of the first motor 11 and the torque of the second motor 21 when the parking brake switch 101 is turned off as the result of checking (S109).

That is, when receiving a turning-off signal of the parking brake switch 101, the controller 100 stops controlling torque of the first motor 11 and the second motor 21 that has been performed for parking brake fail safety so that the vehicle is driven.

When there is still a change in wheel speed as the result of checking in S106, the reason is because the vehicle may be pushed on an uphill slope with a (+) slope or a downhill slope with a (−) slope due to the load thereon and the slope.

In other words, as shown in FIG. 3, if the wheel speed still changes without becoming zero after the controller 3 controls the torque of the first motor 11 and the torque of the second motor 21 to have the same magnitude in opposite directions, the reason is because the vehicle may be pushed on an uphill slope with a (+) slope or a downhill slope with a (−) slope due to the load thereon.

To prevent the vehicle from being pushed, the controller 100 can make the wheel speed zero to stop the vehicle by decreasing the (+) torque of the first motor 11 or decreasing the (−) torque of the second motor 21, as shown in FIG. 3, when the wheel speed still changes without becoming zero such that wheels slightly slip after the torque of the first motor 11 and the torque of the second motor 21 are controlled to have the same magnitude in opposite directions for a predetermined time period.

To the present end, it is possible to determine whether a vehicle is parked on an uphill slope or a downhill slope and then perform parking braking that restricts movement of the vehicle and prevents the vehicle from pushing.

First, the controller 100 determines whether the vehicle is parked on an uphill slope with a (+) slope on the basis of a signal from the longitudinal acceleration sensor 104 (S110) and then checks whether the wheel speed is larger or smaller than zero (0) when determining that it is an uphill slope (S111).

Next, when the controller 100 determines that it is an uphill slope with a (+) slope on the basis of the signal (e.g., (+) output value) from the longitudinal acceleration sensor 104 and the wheel speed is greater than 0 (the vehicle is moving forward), the controller 100 maintains the (−) torque of the second motor 21 and decreases the (+) torque of the first motor 11 until the wheel speed becomes zero (0) (S112).

Since the (−) torque of the second motor 21 is maintained and the (+) torque which is forward torque of the first motor 11 is decreased until the wheel speed becomes zero (0) when the wheel speed is greater than 0 (the vehicle is moving forward), parking braking that restricts movement of the vehicle even on an uphill slope may be easily achieved.

When the wheel speed is greater than 0 (the vehicle is moving forward), it is possible to make the wheel speed zero by increasing the (−) torque of the second motor 21 with the (+) torque of the first motor 21 maintained, but it is advantageous in terms of energy efficiency to decrease the (+) torque of the first motor 11 in comparison to increasing the (−) torque of the second motor 21.

However, when the controller 100 determines that it is an uphill slope with a (+) slope on the basis of the signal (e.g., (+) output value) from the longitudinal acceleration sensor 104 and the wheel speed is smaller than 0 (the vehicle is moving rearward), the controller 100 maintains the (−) torque of the second motor 21 and increases the (+) torque of the first motor 11 until the wheel speed becomes zero (0) (S113).

Since the (−) torque of the second motor 21 is maintained and the (+) torque which is forward torque of the first motor 11 is increased until the wheel speed becomes zero (0) when the wheel speed is smaller than 0 (the vehicle is moving rearward), it is possible to achieve parking braking that prevents the vehicle from being pushed on an uphill slope while restricting movement of the vehicle.

Meanwhile, when the vehicle is not parked on an uphill slope with a (+) slope as the result of determining in S110, the controller 100 determines whether the vehicle is parked on a downhill slope with a (−) slope on the basis of a signal from the longitudinal acceleration sensor 104 (S114), and checks whether the wheel speed is larger or smaller than zero (0) when determining that it is a downhill slope in S115.

Next, when the controller 100 determines that it is a downhill slope with a (−) slope on the basis of the signal (e.g., (−) output value) from the longitudinal acceleration sensor 104 and the wheel speed is greater than 0 (the vehicle is being pushed forward), the controller 100 maintains the (+) torque of the first motor 11 and increases the (−) torque of the second motor 21 until the wheel speed becomes zero (0) (S116).

Since the (+) torque of the first motor 11 is maintained and the (−) torque which is backward torque of the second motor 21 is increased until the wheel speed becomes zero (0) when the wheel speed is greater than 0 (the vehicle is being pushed forward), it is possible to achieve parking braking that prevents the vehicle from being pushed on a downhill slope while restricting movement of the vehicle.

However, when the controller 100 determines that it is a downhill slope with a (−) slope on the basis of the signal (e.g., (−) output value) from the longitudinal acceleration sensor 104 and the wheel speed is smaller than 0 (the vehicle is moving rearward), the controller 100 maintains the (+) torque of the first motor 11 and decreases the (−) torque of the second motor 21 until the wheel speed becomes zero (0) (S117).

Since the (+) torque of the first motor 11 is maintained and the (−) torque which is backward torque of the second motor 21 is decreased until the wheel speed becomes zero (0) when the wheel speed is smaller than 0 (the vehicle is moving rearward), parking braking that restricts movement of the vehicle even on a downhill slope may be easily achieved.

When the wheel speed is smaller than 0 (the vehicle is moving rearward), it is possible to make the wheel speed zero by increasing the (+) torque of the first motor 11 with the (−) torque of the second motor 21 maintained, but it is advantageous in terms of energy efficiency to decrease the (−) torque of the second motor 21 in comparison to increasing the (+) torque of the first motor 11.

Meanwhile, the wheel speed may keep change even though it is determined that the vehicle is parked at a position which is not an uphill sloped with a (+) slope or a downhill slope with a (−) slope as the result of checking in S110 and S114.

That is, the wheel speed may keep change even though it is determined that the vehicle is parked at a position which is not an uphill sloped with a (+) slope or a downhill slope with a (−) slope after the torque of the first motor 11 and the torque of the second motor 21 are increased to have the same magnitude in opposite directions and maintained for a predetermined time period, as in S105.

Accordingly, if there is a change in wheel speed even though it is determined that it is not an uphill slope or a downhill slope on the basis of a signal from the longitudinal acceleration sensor 104 after increasing the torque of the first motor 11 and the torque of the second motor 21 to have the same magnitude in opposite directions and maintain the torque for a predetermined time period, as in S105, the controller 100 checks whether the wheel speed is larger or smaller than zero (0) (S118).

When the wheel speed is greater than 0 (the vehicle is moving forward) as the result of checking in S118, the controller 100 maintains the (−) torque of the second motor 21 and decreases the (+) torque of the first motor 11 until the wheel speed become zero in S119, whereby parking braking that keeps the vehicle stopped may be achieved.

However, when the wheel speed is smaller than 0 (the vehicle is moving rearward), the controller 100 maintains the (+) torque of the first motor 11 and decreases the (−) torque of the second motor 21 until the wheel speed become zero in S120, whereby parking braking that keeps the vehicle stopped may be achieved.

As described above, since it is possible to achieve the parking brake fail safety function of the existing diesel engine trucks even in vehicles such as an electric truck or a fuel cell electric vehicle provided with an electric-axle assembly, it is possible to improve the braking performance of vehicles having an electric-axle over the braking performance of the existing vehicles provided with a diesel engine.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A parking brake fail safety control system for a vehicle having an electric-axle, the system comprising:
   a parking brake switch of a vehicle and configured to be turned on in response to a driver's operation;
   a wheel speed sensor of the vehicle and configured for detecting a change in wheel speed of the vehicle;
   a first motor of the vehicle and included in a rear wheel-first electric-axle of the vehicle, wherein the electric-axle of the vehicle includes the rear wheel-first electric-axle;
   a second motor of the vehicle and included in a rear wheel-second electric-axle of the vehicle, wherein the electric-axle of the vehicle further includes the rear wheel-second electric-axle; and
   a controller of the vehicle and electrically connected to the parking brake switch, the wheel speed sensor, the first motor and the second motor and configured for determining that a parking brake of the vehicle fails and controlling torque of the first motor and torque of the second motor to have a same magnitude in opposite directions upon determining that there is the change in the wheel speed according to a signal received from the wheel speed sensor after receiving a turning-on signal of the parking brake switch,
   wherein the wheel speed sensor, the first motor, the second motor and the controller are all mounted in one vehicle.

2. The system of claim 1, further including a door-opening sensor electrically connected to the controller and configured for outputting an opening signal when a door of the vehicle is open, to facilitate the controller to determine whether the parking brake fails.

3. The system of claim 2, wherein the controller is configured to determine that the parking brake fails and to control the torque of the first motor and the torque of the second motor to have the same magnitude in the opposite directions, upon determining that there is the change in the wheel speed according to the signal received from the wheel speed sensor after receiving the opening signal from the door-opening sensor.

4. The system of claim 1, further including a longitudinal acceleration sensor electrically connected to the controller and configured for facilitating the controller to determine whether the vehicle is on an uphill slope with a positive slope or a downhill slope with a negative slope upon determining that there is still the change in the wheel speed after the torque of the first motor and the torque of the second motor are controlled to have the same magnitude in the opposite directions.

5. The system of claim 4, wherein the controller is configured to decrease the torque of the first motor until the wheel speed becomes zero when the wheel speed is greater than 0 and increases the torque of the first motor until the wheel speed becomes zero when the wheel speed is smaller than 0, when the controller determines that the vehicle is on the uphill slope according to a signal received from the longitudinal acceleration sensor.

6. The system of claim 4, wherein the controller is configured to increase the torque of the second motor until the wheel speed becomes zero when the wheel speed is greater than 0 and to decrease the torque of the second motor until the wheel speed becomes zero when the wheel speed is smaller than 0, when the controller determines that the vehicle is on the downhill slope according to a signal received from the longitudinal acceleration sensor.

7. The system of claim 4, wherein the controller is configured to decrease the torque of the first motor until the wheel speed becomes zero when the wheel speed is greater than 0 and to decrease the torque of the second motor until the wheel speed becomes zero when the wheel speed is smaller than 0, even though the controller determines that the vehicle is not on the uphill slope or the downhill slope according to a signal received from the longitudinal acceleration sensor.

8. A parking brake fail safety control method for a vehicle having an electric-axle, the method comprising:
   determining, by a controller, whether a parking brake switch of the vehicle and electrically connected to the controller is turned on;
   determining, by the controller, whether a parking brake of the vehicle fails; and
   controlling, by the controller, torque of a first motor of the vehicle and included in a rear wheel-first electric-axel of the vehicle and torque of a second motor of the vehicle and included in a rear wheel-second electric-axle of the vehicle to have a same magnitude in opposite directions, when the controller determines that the parking brake fails,
   wherein the electric-axle of the vehicle includes the rear wheel-first electric-axle and the rear wheel-second electric-axle,
   wherein the first motor, the second motor and the controller are all mounted in one vehicle.

9. The method of claim 8, wherein the determining of whether a parking brake fails includes:
   detecting a wheel speed of the vehicle by a wheel speed sensor electrically connected to the controller;
   checking whether there is a change in the wheel speed according to a detection signal received from the wheel speed sensor after receiving a turning-on signal from the parking brake switch; and
   determining that the parking brake fails when there is the change in the wheel speed.

10. The method of claim 8, wherein the determining of whether a parking brake fails includes:
    detecting, by a door-opening sensor electrically connected to the controller, whether a door of the vehicle is opened;
    detecting a wheel speed of the vehicle by a wheel speed sensor electrically connected to the controller;
    checking, by the controller, whether there is a change in the wheel speed according to a detection signal received from the wheel speed sensor after a door-opening signal is received from the door-opening sensor; and
    determining, by the controller, that the parking brake fails when there is the change in the wheel speed.

11. The method of claim 8, further including determining whether the vehicle is on an uphill slope with a positive slope or a downhill slope with a negative slope when there is still the change in the wheel speed after the torque of the first motor and the torque of the second motor are controlled by the controller to have the same magnitude in the opposite directions.

12. The method of claim 11, wherein when the controller determines that the vehicle is on the uphill slope, the torque of the first motor is decreased by the controller until the wheel speed becomes zero when the wheel speed is greater than 0 and the torque of the first motor is increased by the controller until the wheel speed becomes zero when the wheel speed is smaller than 0.

13. The method of claim 11, wherein when the controller determines that the vehicle is on the downhill slope, the torque of the second motor is increased by the controller until the wheel speed becomes zero when the wheel speed is greater than 0 and the torque of the second motor is decreased by the controller until the wheel speed becomes zero when the wheel speed is smaller than 0.

14. The method of claim 11, wherein even though the controller determines that the vehicle is not on the uphill slope or the downhill slope, the torque of the first motor is decreased by the controller until the wheel speed becomes zero when the wheel speed is greater than 0 and the torque of the second motor is decreased by the controller until the wheel speed becomes zero when the wheel speed is smaller than 0.

15. The method of claim 8, wherein the controller includes:
    a processor configured for executing a program for performing the method of claim 8; and
    a non-transitory storage medium configured for recording the program of performing the method of claim 8.

16. A non-transitory computer readable storage medium on which a program for performing the method of claim 8 is recorded.

17. A parking brake fail safety control system for a vehicle having an electric-axle, the system comprising:
    a parking brake switch of a vehicle configured to be turned on in response to a driver's operation;
    a wheel speed sensor of the vehicle configured for detecting a change in wheel speed of the vehicle;
    a first motor of the vehicle included in a rear wheel-first electric-axle of the vehicle, wherein the electric-axle of the vehicle includes the rear wheel-first electric-axle;
    a second motor of the vehicle included in a rear wheel-second electric-axle of the vehicle, wherein the electric-axle of the vehicle further includes the rear wheel-second electric axle; and
    a controller electrically connected to the parking brake switch, the wheel speed sensor, the first motor and the second motor and configured for determining that a parking brake of the vehicle fails and controlling torque of the first motor and torque of the second motor to have a same magnitude in opposite directions until the wheel speed becomes zero upon determining that there is the change in the wheel speed according to a signal received from the wheel speed sensor after receiving a turning-on signal of the parking brake switch,
    wherein the parking brake switch, the wheel speed sensor, the first motor, the second motor and the controller are all mounted in one vehicle.

* * * * *